(No Model.)
M. FOWLER.
SHEET METAL SPOON.
No. 247,554. Patented Sept. 27, 1881.
*Fig. 1*
*Fig. 2*
*Fig. 3*
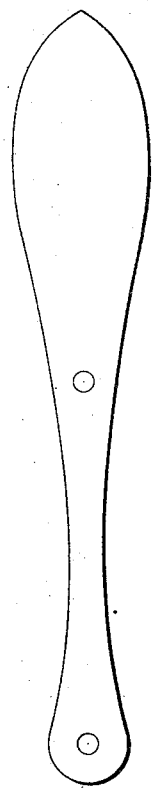
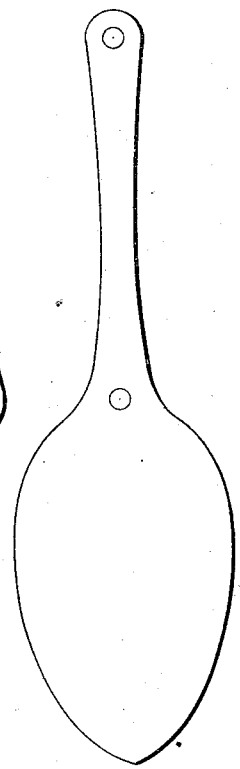
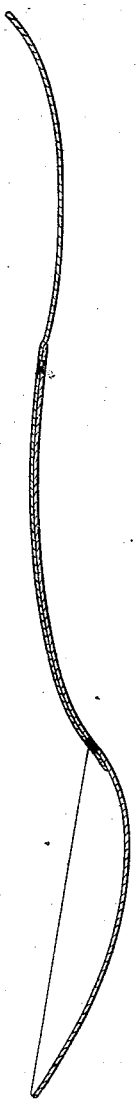
WITNESSES
Orrin L. Geralds
Daniel S. Glenney Jr.
INVENTOR
Maltby Fowler
by George Terry
Atty

UNITED STATES PATENT OFFICE.

MALTBY FOWLER, OF NORTHFORD, CONNECTICUT.

SHEET-METAL SPOON.

SPECIFICATION forming part of Letters Patent No. 247,554, dated September 27, 1881.

Application filed February 16, 1881. (No model.)

*To all whom it may concern:*

Be it known that I, MALTBY FOWLER, of Northford, in the county of New Haven and State of Connecticut, have invented a new and useful Improvement in Sheet-Metal Spoons, of which the following is a description.

My invention relates to sheet-metal spoons, its object being to stiffen the narrow parts of their handles.

The invention consists in making the spoons in two parts, each part having the narrow part of the handle, in placing the narrow parts over each other, and in fastening them together by rivets.

Figure 1 in the accompanying drawings is a view of the handle, and Fig. 2 is a view of the bowl and of the duplicate narrow overlapping part of the handle. Fig. 3 is a central and longitudinal section of the spoon, showing the overlapping narrow parts of the handle and the rivets through them.

To enable others to make my improvement in spoons, I will describe it and the way it is made in detail.

The handle (shown in Fig. 1) is punched from sheet metal in the form shown, the rivet-holes being afterward punched. The bowl and duplicate narrow part of the handle (shown in Fig. 2) are also punched from sheet metal in the form shown, the rivet-holes being punched afterward. The narrow part connected with the bowl, or part forming the bowl when raised, is placed either under or over, as desired, the narrow part of the handle, and the two narrow parts are riveted together. The parts are then formed into proper shape by dies in the usual way of forming sheet-metal spoons.

When the spoons thus made are made from sheet-iron they may be tinned by the usual and well-known process of tinning sheet-iron spoons, and the tin will solder the overlapping parts together and conceal the joint. When the spoons are made from sheet-tin they may be dipped in melted tin, and the joint between the parts will be filled with tin, and the joint be concealed, and also the rivets.

The handles of sheet-metal spoons having their narrow parts made of two thicknesses, as above described, approximate in stiffness the handles of graded spoons, which are made from blanks, and have the narrow parts of their handles thicker than their other parts.

Knowing that various devices have been used to stiffen the narrow parts of the handles of sheet-metal spoons,

What I claim as my invention, and desire to secure by Letters Patent, is—

The herein-described sheet-metal spoon, consisting of two parts, each part having the narrow part of the handle, the narrow parts overlapping each other and riveted together, substantially as shown and set forth.

MALTBY FOWLER.

Witnesses:
GEORGE TERRY,
DANIEL S. GLENNEY, Jr.